US006216390B1

(12) United States Patent
Peregrin Gonzalez

(10) Patent No.: US 6,216,390 B1
(45) Date of Patent: Apr. 17, 2001

(54) HYDROPONIC CULTURE PROCEDURE AND DEVICE FOR IMPLEMENTING IT

(75) Inventor: Gerardo Peregrin Gonzalez, Pulpi (ES)

(73) Assignee: Instain, S.A., Pulpi (ES)

( * ) Notice: Subject to any disclaimer, the term of this patent is extended or adjusted under 35 U.S.C. 154(b) by 0 days.

(21) Appl. No.: 09/230,429

(22) PCT Filed: Jan. 24, 1997

(86) PCT No.: PCT/ES97/00012

§ 371 Date: Jan. 25, 1999

§ 102(e) Date: Jan. 25, 1999

(87) PCT Pub. No.: WO98/04115

PCT Pub. Date: Feb. 5, 1998

(30) Foreign Application Priority Data

Jul. 25, 1996 (ES) .................................... 9601651

(51) Int. Cl.$^7$ .................................................. A01G 31/00
(52) U.S. Cl. ............................................................ 47/62 R
(58) Field of Search ................................. 47/47, 59, 60, 47/62 R, 62 A, 62 C, 62 E, 62 N

(56) References Cited

U.S. PATENT DOCUMENTS

| 3,603,034 | 9/1971 | Maxwell-Stewart | 47/79 |
| 3,667,157 | * 6/1972 | Longhini | 47/59 |
| 3,823,508 | 7/1974 | Takehara | 47/1.2 |
| 4,178,716 | * 12/1979 | Harper et al. | 47/62 N |
| 4,291,499 | * 9/1981 | Prewer | 47/59 |
| 4,334,386 | 6/1982 | Burcombe | 47/62 |
| 4,392,327 | * 7/1983 | Sanders | 47/47 |
| 4,860,490 | 8/1989 | Morris et al. | 47/63 |
| 5,010,686 | 4/1991 | Rivest | 47/62 |
| 5,201,141 | * 4/1993 | Ahm | 47/67 |

FOREIGN PATENT DOCUMENTS

| 0301619 | 2/1989 | (EP) . |
| 0406458 | 1/1991 | (EP) . |

* cited by examiner

Primary Examiner—Charles T. Jordon
Assistant Examiner—Francis T. Palo
(74) Attorney, Agent, or Firm—Ostrolenk, Faber, Gerb & Soffen, LLP

(57) ABSTRACT

A hydroponic culture procedure and device which provides for attachment of plant roots and further provides channel units for fertilizer liquid. In the device, successively hanged channel units are established on parallel supports. An upper sheet has holes for the implantation of respective plants. A lower sheet, devoid of holes, acts as a sump. Intermediate sheets are provided between the upper and lower sheets, and have the same number of holes as the upper sheet, although longitudinally offset. The channel units are fed by a tube that supplies water and nutrients, and which also provides temperature control. From this tube emerges, above the upper sheet, a micro-tube or similar device for feeding the water to individual plants. The liquid descends in the form of a cascade along the channel units and through the holes down to the lower channel unit, and in turn directs the plant roots along the same path of the nutrients.

9 Claims, 2 Drawing Sheets

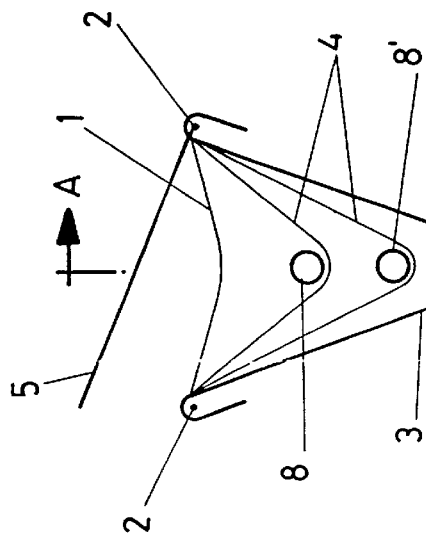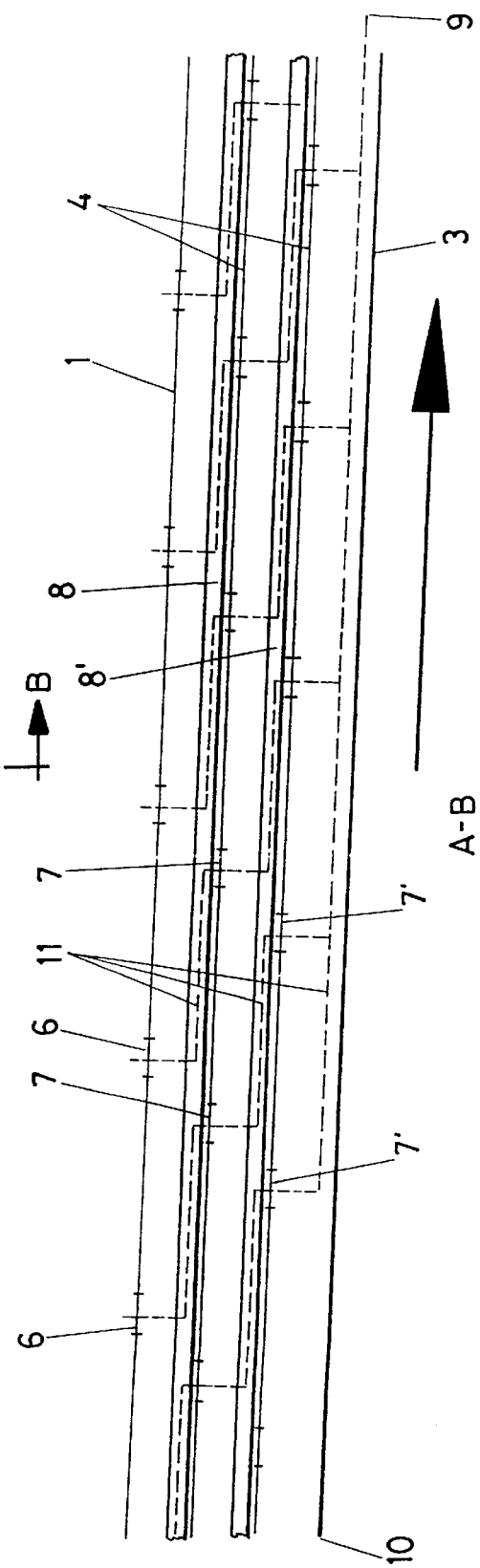

HYDROPONIC CULTURE PROCEDURE AND DEVICE FOR IMPLEMENTING IT

BACKGROUND OF THE INVENTION

1. Field of the Invention

The present invention lies within the scope of hydroponic cultures, namely cultures without earth, the object being to achieve a substantial simplification of the facilities and an equally substantial increase in yield.

The invention is furthermore related to the device for implementing said procedure.

2. Description of the Related Art

It is known that a hydroponic culture consists in an artificial culture process normally performed in shallow buckets to which a fertilizer liquid is added with a formulation that meets the nutrient requirements of a specific type of plant being grown, so that with adequate lighting, which may also be artificial, and adequate concentrations and proportions or nutrients dissolved in water, the plant growing conditions are optimal, providing far greater crops than those obtained by traditional methods.

A series of other advantages are furthermore achieved, such as greater plantation density, perfect overall root and plant protection against pathogenic agents, etc.

However, hydroponic cultures present a vitally important problem in regard to the plant's physical support means. The root of a plant plays a double role, namely that of absorbing the nutrients required by the plant and that of providing a physical support for the plant by taking root in the ground.

Hydroponic cultures do not require earth and therefore the plant's traditional physical support means disappears, thus requiring said traditional support to be replaced by some other means having no detrimental effect on the crop in any of the above aspects. In this regard, inert matter such as high granulometric sand is used as a rooting physical support means, although this sand is occasionally difficult to obtain, is quite expensive and also poses several limitations to the farming facility as a result of its nature and weight.

Furthermore, although sand is in fact an inert matter, it may carry harmful germs to the plants, as initial thorough washing step therefore being essential, which furthermore has a negative economical effect.

U.S. Pat. No. 3,823,500 discloses a method for hydroponic culture using a unit for hydroponic culture forming multiple channels based on superimposed strata perforated allowing multiple cascading paths for the liquid fertilizer as well as a staggered path for the plant roots through the different strata which constitute also a physical support for the plants. However, the units used in said method do not include slanting parallel filiform supports.

EP-A 0 406 458 discloses a device for hydroponically growing plants comprising a laminar body of an indefinite length formed by a pair of superposed layers of water-impervious material, interconnected along a longitudinal edge thereof and sealed along sealing lines extending transverse to and spaced along the longitudinal direction of the laminar body. However, said device does not contain holes along the median line of the dihedron or additional intermediate bodies with additional holes.

SUMMARY OF THE INVENTION

The procedure proposed by the invention solves the above problems in a fully satisfactory manner by eliminating the traditional need to provide a rooting substrate for the plants based on coarse sand or some similar inert matter.

Toward this end, and stated more specifically, said procedure consists in establishing a stratified laminar support, i.e. a support based on several superimposed sheets which, in addition to providing channel units for the fertilizer liquid, constitutes a means of attachment for the plant roots as it is fitted with offset holes through which labyrinthine conducts are formed for the roots, and thus, as the plant grows and consequently requires a greater stability, the roots become progressively lodged in the holes in the various strata, thereby providing an optimum mechanical attachment.

The implementation of this procedure involves the use of a device structured on the basis of a plurality of sheets having different widths designed to form a plurality of superimposed channel units of an indefinite length fitted with folded edges for supporting a pair of parallel cables or rods, the ends of which are attached to supports of an adequate height conveniently designed to raise the multiple channels and to optimize the operators' working conditions.

More specifically, the various sheets form dihedrons having different angles which form superimposed channels with a common mouth, the lower sheet being totally closed whereas the remaining sheets are provided with holes which in the upper sheet are spaced from each other according to the spacing foreseen for the plants, the holes being offset in the lower sheets in order to achieve a "cascading" effect based on a certain lengthwise slant of the overall multiple channel units.

The upper sheet acts exclusively as a physical support for attaching the plants, while the intermediate sheets, in addition to taking part in the above-mentioned rooting effect, constitute cascading channels for the fertilizer liquid which is supplied through a tube with multiple outlets positioned within the recess of each channel unit and which flows on all of the channel units, cascading from one to the other and thus providing irrigation and oxygenation to the roots of the plants.

The lower sheet or channel unit acts as a sump for the residual fertilizer liquid, which is recycled and is therefore used in its entirety.

BRIEF DESCRIPTION OF THE DRAWINGS

In order to complement this description and help to provide a better understanding of the characteristics of the invention, a set of drawings is attached to this specification, being an integral part thereof, wherein the following is represented with an illustrative, non-limiting character:

FIG. 1 shows a schematic, cross section view of a hydroponic culture device fabricated according to the object of the present invention.

FIG. 2 shows a schematic, side elevation, longitudinal section view of the device shown in the previous figure, according to the A-B section line in said figure.

Finally.

DETAILED DESCRIPTION OF THE PREFERRED EMBODIMENT

Figure 3:
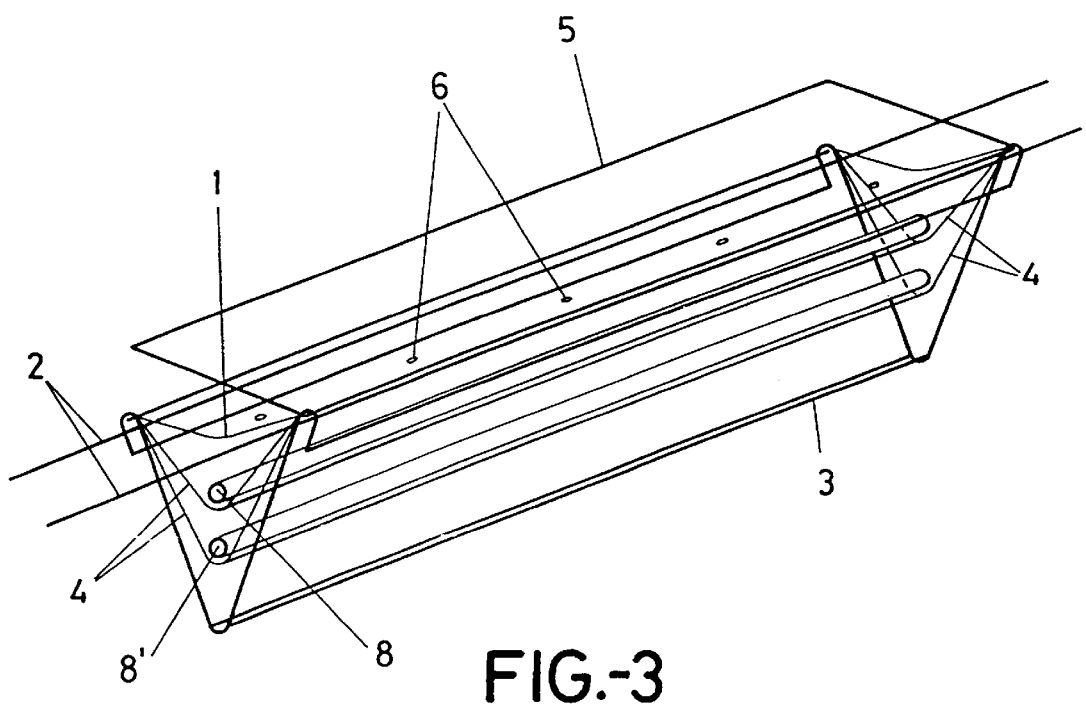
FIG. 3 shows a schematic, perspective view of the device in question.

In the example of a practical embodiment shown in the drawings, a hydroponic culture device is shown comprising an upper sheet (1), preferably made of plastic, in the form of a longitudinal band of an indefinite length which, with the assistance of a pair of lateral supports (2) composed of cables or rods, forms an obtuse dihedron, a lower sheet (3), considerably wider than the previous sheet, also of a plastic nature, preferably opaque, in turn forms an acute dihedron and is supported by the same supports (2), and between these upper and lower sheets (1) and (3), and a set of intermediate sheets (4), also having a dihedric shape and supported by the same supports (2). The number of intermediate sheets (4) may vary according to the specific requirements in each case, namely the type of plant being cultivated.

A cover (5) provides an initial protection for the small plants or seeds at the start of the culture process and protects the first roots from the light.

The upper sheet (1) is provided—along its median line, i.e. the dihedron edge formed by said line—with a plurality of evenly distributed holes (6) which correspond to the spacing foreseen for the plants to be grown, each of the intermediate sheets (1) being in turn provided with a number of holes (7) identical to that of the upper sheet (1), although longitudinally offset in a staggered manner, as can be seen particularly in FIG. 2. The second sheet (3) is devoid of holes.

In the channel units established by the intermediate sheets (4), feeding tubes (8-8') are installed for the fertilizer liquid, which simultaneously acts as a liquid thermic transmitter for adequate temperature control in the culture facility.

According to this structure, the upper sheet (1) acts exclusively as a physical support for either the plant's bare root or for its root and substrate, the root becoming attached to the sheet by lodging inside the holes (6), the first roots being protected against the light, the intermediate sheets (4) also cooperating in said physical support function in view that, as the plant grows, the root in each plant first reaches holes (7), then holes (7') and so forth, in the event that a larger number of intermediate sheets (4) is provided, whereby rooting takes place at different levels and the mechanical attachment of the plant increases as its size increases, thereby remaining permanently stable.

The channel assembly is assisted by the water/nutrients and temperature control tube (8). From this tube emerges, toward the upper area above the upper sheet, a micro-tube or similar device for feeding each watering unit individually, so tat the roots of the plants are fully immersed in said intermediate channel units, the fertilizer liquid descending in a cascade by virtue of the longitudinal offsetting between holes (7) and (7'), down to the lower sheet (3) which, as previously stated, acts as a sump for the excess fertilizer liquid.

The longitudinal offsetting of the holes (6), (7) and (7') is oriented in the same direction as the slanting of the overall multiple channel unit, so that at the lower end (9) of said channel unit, i.e. its outlet, a general sump is established, not shown, wherein the liquid fertilizer is recycled toward the starting point (10) of the multiple channel unit for the integral use thereof.

The roots follow the path of the liquid fertilizer, the rooting thus taking place according to the full lines (11) shown in FIG. 2.

This description need not be more extensive for an expert on the subject to understand the scope of the invention and the advantages deriving therefrom.

The materials, shape, size and arrangement of the elements are liable to variation provided no alteration to the essence of the invention is involved.

The terms of this specification should at all times be taken in their ample, non-limiting sense.

What is claimed is:

1. Procedure for hydroponic culture, characterized by hanging, from a pair of slanting parallel supports, a multiple channel unit comprising superimposed sheets having different widths, which form dihedrons having different angles but with a common mouth, an upper sheet being provided, along its median line, with a plurality of evenly distributed holes, which correspond to a spacing foreseen for plants to be grown, at lest one intermediate sheet being provided with a number of holes identical to that of the upper sheet although longitudinally offset in a staggered manner, which are oriented in the same direction as the slanting of the overall multiple channel unit, and a lower sheet being devoid of holes, in order to establish, along said channel unit, multiple cascading paths for fertilizer liquid as well as a staggered path for plant roots through the different sheets, such that the sheets furthermore constitute the physical rooting support for the plants.

2. Device for implementing hydroponic culture, comprising:

an upper sheet which forms a substantially obtuse dihedron attached at its corners to supports, and which, along its median line, incorporates a plurality of evenly distributed holes corresponding to a spacing foreseen for plants to be grown, and hanging from said supports is a lower sheet devoid of holes which act as a general sump for the device, while between the upper and lower sheets several intermediate sheets are provided which define equally intermediate channel units provided with holes that coincide numerically with, but are longitudinally offset from, the holes of the upper sheet.

3. Device for hydroponic culture, according to claim 2, wherein within recesses between the sheets which define the intermediate channel units, tubes are established which simultaneously act as suppliers of fertilizer liquid and as a means of heat conditioning the culture via the temperature of the fertilizer itself, emerging from said tubes toward the upper area above the upper sheet is a device for feeding each watering unit individually through the holes of the upper sheet, so that said tubes feed fertilizer liquid to all of the upper sheet holes, said fertilizer liquid cascading from one intermediate sheet to the other, down to the lower sheet which acts as a sump.

4. Device for hydroponic culture, according to claim 2 wherein, at a lower end of the multiple channel unit a sump is established wherefrom excess fertilizer liquid is recycled toward an upper end for reuse.

5. Device for hydroponic culture, according to claim 2, wherein, on one of the supports, a cover is attached for protecting roots of the plant from light.

6. Device for hydroponic culture, according to claim 3, wherein, at a lower end of the multiple channel unit a sump is established wherefrom excess fertilizer liquid is recycled toward an upper end for reuse.

7. Device for hydroponic culture, according to claim 3, wherein, on one of the supports, a cover is attached for protecting roots of the plant from light.

8. Device for hydroponic culture, according to claim 4, wherein, on one of the supports, a cover is attached for protecting roots of the plant from light.

9. Device for hydroponic culture, according to claim 6, wherein, on one of the supports, a cover is attached for protecting roots of the plant from light.

* * * * *